United States Patent
Wewers et al.

(10) Patent No.: US 12,274,978 B2
(45) Date of Patent: Apr. 15, 2025

(54) ACCUMULATOR AND DISSIPATION ASSEMBLY FOR CAPTURING EXIGENT VENTED VOLATILE FLUIDS

(71) Applicant: Liquidat-R, LLC, Lenexa, KS (US)

(72) Inventors: Frank Wewers, Lenexa, KS (US); Steven P. Gautieri, Gladstone, MO (US); Michael J. Gautieri, Gladstone, MO (US)

(73) Assignee: Liquidat-R, LLC

( * ) Notice: Subject to any disclaimer, the term of this patent is extended or adjusted under 35 U.S.C. 154(b) by 0 days.

(21) Appl. No.: 18/770,059

(22) Filed: Jul. 11, 2024

(65) Prior Publication Data

US 2025/0018331 A1    Jan. 16, 2025

Related U.S. Application Data (60) Provisional application No. 63/512,982, filed on Jul. 11, 2023.

(51) Int. Cl.
| | |
|---|---|
| *B01D 53/18* | (2006.01) |
| *F25B 9/00* | (2006.01) |
| *F25B 43/00* | (2006.01) |
| *F25B 45/00* | (2006.01) |

(52) U.S. Cl.
CPC .............. *B01D 53/18* (2013.01); *F25B 9/002* (2013.01); *F25B 43/006* (2013.01); *F25B 45/00* (2013.01); *B01D 2257/406* (2013.01); *B01D 2258/02* (2013.01); *F25B 2345/002* (2013.01)

(58) Field of Classification Search
CPC ...... B01D 53/18; B01D 225/406; F25B 9/002
See application file for complete search history.

(56) References Cited

U.S. PATENT DOCUMENTS

| | | | | |
|---|---|---|---|---|
| 3,861,890 | A | * | 1/1975 | Doncer .............. B01D 53/1418 95/194 |
| 4,036,615 | A | * | 7/1977 | Heintzelman .......... B01D 45/08 55/DIG. 14 |
| 5,333,461 | A | * | 8/1994 | Cobb ...................... F25B 45/00 62/529 |
| 5,464,466 | A | * | 11/1995 | Nanaji ................. B67D 7/0476 95/45 |
| 5,571,310 | A | * | 11/1996 | Nanaji ................. B67D 7/0476 96/174 |

(Continued)

FOREIGN PATENT DOCUMENTS

| | | |
|---|---|---|
| CN | 114777364 A | 7/2022 |
| WO | 9958920 A1 | 11/1999 |

OTHER PUBLICATIONS

International Search Report and Written Opinion of the International Searching Authority Patent Application No. PCT/US2024/037629 mailed Oct. 18, 2024, Patent Cooperation Treaty.

*Primary Examiner* — Jonathan Miller (57) ABSTRACT

A system for capturing volatile fluids and agglomerations discharged from chemical and refrigerant systems during an overpressure situation includes an energy dissipation assembly that uses impact bars and irregular surfaces to decrease the energy of such discharges by breaking up the agglomerations, and one or more tanks for capturing constituents for reuse, safe venting to atmosphere, or disposal.

20 Claims, 8 Drawing Sheets

(56) References Cited

U.S. PATENT DOCUMENTS

| | | | | |
|---|---|---|---|---|
| 5,787,728 | A * | 8/1998 | Das | F25B 43/006 |
| | | | | 62/503 |
| 5,843,212 | A * | 12/1998 | Nanaji | B01D 53/22 |
| | | | | 96/174 |
| 9,696,071 | B2 * | 7/2017 | Pan | B01D 45/12 |
| 10,782,050 | B2 * | 9/2020 | Ignatiev | F25B 23/00 |
| 2002/0189213 | A1 * | 12/2002 | Neuschwander | B01D 45/08 |
| | | | | 55/423 |
| 2003/0079496 | A1 * | 5/2003 | Schroeder | B01D 45/06 |
| | | | | 62/503 |
| 2011/0209446 | A1 * | 9/2011 | Kayat | B01D 45/12 |
| | | | | 55/322 |
| 2014/0033917 | A1 * | 2/2014 | Rodgers | B01D 45/16 |
| | | | | 96/57 |
| 2020/0033032 | A1 * | 1/2020 | Ignatiev | F25B 23/00 |
| 2022/0042722 | A1 * | 2/2022 | Lingelbach | F25B 43/006 |

\* cited by examiner

ACCUMULATOR AND DISSIPATION ASSEMBLY FOR CAPTURING EXIGENT VENTED VOLATILE FLUIDS

CROSS-REFERENCE TO RELATED APPLICATIONS

This application claims priority in U.S. Patent Application Ser. No. 63/512,982, filed Jul. 11, 2023, the contents of which are hereby incorporated by reference.

BACKGROUND

1. Field of the Disclosed Subject Matter

The disclosed subject matter relates generally to a volatile fluid collection device.

2. Background

Many commercial and industrial processes, such as hospitals, laboratories, commercial structures, and manufacturers use volatile fluids, such as chemicals and refrigerants in various closed systems. Occasionally unexpected or unusually high pressure occurs in the closed systems resulting in an over-pressured system. Current standards require overpressure safety systems to react to overpressure situations by releasing the volatile fluids to the atmosphere. But, the outdoor weather conditions, and the composition of the volatile fluids complicate safe handling.

A widely used refrigerant is liquid anhydrous ammonia. Ammonia is utilized in the food industry for processing, transporting, packaging, storing, and preserving needs. Ammonia is a very efficient, abundant, low-cost, and environmentally friendly refrigerant to manufacture and use. There are challenges to using anhydrous ammonia. Ammonia has a boiling point of −28 degrees Fahrenheit possessing one of the highest hydroscopic affinities for water, which means that it seeks water from the nearest source, including the human body. This attraction places the eyes, lungs, and skin at greatest risk because of the high moisture content. When ammonia is combined with water, it creates ammonium hydroxide, which is a corrosive high pH basic substance. Caustic burns result when the anhydrous ammonia dissolves into body tissue.

Most deaths from anhydrous ammonia are caused by severe damage to the throat and lungs from direct contact with the face. When large amounts of anhydrous ammonia are inhaled, the throat swells shut, and victims suffocate. Exposure to vapors or liquid can also cause blindness.

An additional concern is the low boiling point of anhydrous ammonia. The chemical possesses a high vapor pressure which flashes easily and freezes on contact at room temperature. It will cause burns similar to, but more severe than, those caused by dry ice. Ammonia is hazardous to human life while in a multiphase-liquid, aerosol, or concentrated migrating gaseous plume.

When used as a refrigerant gas and in air-conditioning equipment, ammonia can absorb substantial amounts of heat from its surroundings. Ammonia can be used to purify water supplies and as a building block in the manufacture of many products including plastics, explosives, fabrics, pesticides, and dyes. It is also used as a fuel for transportation and as a major fertilizer for crops.

Occasionally unexpected or unusually high pressure begins to build in refrigeration systems. This is typically caused by a component failure. It is imperative to relieve the over-pressured system by means of a self-activating over pressure sensing valve, versus the alternative of an explosive release inside the facility causing death to most personnel. When the overpressure safety relief valve is activated, or opened, it releases the high-pressure ammonia fluid and agglomerates via the pipes of the system where it is routed to the rooftop of the same facility that houses the refrigeration units. Rooftop emergency venting system are required so that the anhydrous ammonia can be released away from personnel working in the building.

Unfortunately, these efforts taken to date to mitigate the hazards of a volatile fluid releases do not address the transient unpredictable nature of high-speed agglomerations within the fluid. These high-speed agglomerations exhibit momentum with enough energy that may rupture the vent piping within the facility before reaching the exhaust vent on the rooftop, resulting in part, to the hazardous release of ammonia into the facility, and in contact with personnel.

Some conditions could occur that do not facilitate combinations of all scenarios. Despite the location of venting on a rooftop furthest away from personnel, there still exists a set of circumstances and ambient conditions (including severity of the release) that have caused fatal harm to not only individuals in the facility, but others in nearby facilities.

Two examples out of numerous scenarios not covered by the current industry standard for volatile fluid venting safety requirements are described below.

First, when anhydrous ammonia is released on warm sunny dry day (80 degrees Fahrenheit with 40 percent relative humidity or lower) small liquid or aerosol releases will typically evaporate, dissipate, and rise above the facility. However, in cloudy humid ambient conditions, ammonia becomes heavier than air with its highly hydroscopic properties or attraction for water. Therefore, in the event of a release, ammonia will tend to utilize the Van DeGraff forces preserving an un-interrupted high concentration invisible falling plume that can linger on the ground for long periods of time. Personnel could unintentionally walk into this invisible cloud with no warning and not know which way to move for fresh air. Usually, by then it's too late.

Second, should a large release occur, possibilities exist where fluid is ejected from the rooftop vent pipe, thereby falling to the roof surface or splashing nearby on lower elevations. It is thereby left to the current weather conditions to dictate how quickly the liquid will evaporate or create dangerous lingering life-threatening clouds of gas affecting nearby facilities or individuals inside or outside the venting facility.

SUMMARY

The disclosure includes an apparatus that captures volatile fluids and agglomerations discharged from chemical and refrigerant systems during an overpressure situation, and dissipates the energy of such discharges by use of an apparatus that decreased the velocity of the discharge, breaks up agglomerations, and captures constituents of the discharge for reuse, safe venting to atmosphere, or disposal.

In some implementations, the disclosed subject matter includes an impact bar with a first outer sidewall and a second outer sidewall, where each sidewall forms a convex surface, a reservoir tank with an internal sidewall forming an irregular surface, where the impact bar presents an angled upper surface directed toward the internal sidewall.

In addition, the impact bar can include a V-shaped channel disposed between the first outer sidewall and second outer sidewall. The V-shaped channel may be formed by a first interior sidewall and a second interior sidewall with a first upper edge formed by the intersection of the first outer sidewall and the first interior sidewall, and a second upper edge formed by the intersection of the second outer sidewall and the second interior sidewall. The irregular surface can be a plurality of protrusions.

Further, a primary tank with a first compartment in fluid communication with the reservoir tank may be used. The reservoir tank includes a first baffle with a port and a downwardly open cover around the port. The primary tank has an exhaust vent in fluid communication with the tank. The primary tank may also include a second baffle, and a third baffle with a port and a downwardly open cover around the port, where the second baffle is between the first and third baffle. A secondary tank in fluid communication with the primary tank may be used.

In some implementations, the disclosed subject matter includes a dissipation assembly with an impact bar and a reservoir tank. The impact bar has a V-shaped channel formed by a first interior sidewall and a second interior sidewall. The reservoir tank has an internal sidewall forming an irregular surface, and the impact bar presents an angled upper surface directed toward the internal sidewall.

In some implementations, the disclosed subject matter includes a system for capturing exigent vented volatile fluids using a dissipation assembly within a reservoir tank, where the reservoir tank is in fluid communication with a primary tank. The dissipation assembly includes a tubular body forming a sidewall extending from an inlet to a lower opening with an angled bottom plate. The tubular body has a port extending through the sidewall. An impact bar within the tubular body has a first outer sidewall and a second outer sidewall, with each sidewall forming an outwardly projecting convex surface, and a V-shaped channel disposed between the first outer sidewall and the second outer sidewall, with the V-shaped channel being in fluid communication with the port. The reservoir tank includes a tubular body forming a sidewall extending from an upper portion to a lower portion, an irregular surface at an interior of the reservoir tank. The port is directed toward the irregular surface. The primary tank includes several compartments. The first compartment is in fluid communication with the reservoir tank. A first baffle within the primary tank has a port with a downwardly open cover around the port. An exhaust vent is in fluid communication with the primary tank. Lastly, a drop leg valve in fluid communication with the primary tank.

In addition, the apparatus can include a second and third baffle within the primary tank, with the third baffle having a port with a downwardly open cover around the port. The first and third baffles can form a lower opening, and the second baffle can form an upper opening. A secondary tank in fluid communication with the primary tank may be used. The irregular surface can be a plurality of protrusions.

The apparatus above can be used with chemical systems, and ammonia refrigeration system.

BRIEF DESCRIPTION OF THE DRAWINGS

The present disclosed subject matter is described herein with reference to the following drawing figures, with greater emphasis being placed on clarity rather than scale.

DETAILED DESCRIPTION

An endothermic transient depressive accumulator (ETDA) system in the form of an accumulator and dissipation system 100 captures volatile fluids and agglomerations discharged from chemical and refrigerant systems during an overpressure situation. The volatile fluids include liquid, and a mixture of other components, such as vapor, gasses, oils, aerosols, and solids. Volatile fluids can be under pressure resulting in a situation where the fluid mixture is exigently vented or abruptly released, resulting in a high-velocity fluid agglomeration in need of safe containment, recapture, and venting to bring the chemical or refrigeration system back to a stable operating pressure and operating conditions.

Conventional chemical and refrigerant systems handle the discharge of volatile fluids by absorbing vented releases using water filled tanks, and venting the fluid mixture to the atmosphere via a conduit discharge outlet, such as an outlet at the exterior of a building. The abrupt release of hazardous volatile fluids to the atmosphere causes rapid evaporation or flashing, causing the release of liquid and gas, resulting in hazards to the surrounding environment and humans and other animals, and requiring an immediate emergency response to address medical needs, and chemical clean up and remediation. The accumulator and dissipation system 100 of the disclosed subject matter captures the volatile fluids exiting chemical and refrigerant systems prior to any venting to the atmosphere to dissipate the volatile nature of the discharge and capture volatile fluids for reuse or disposal.

Referring to FIGS. 1-7, an implementation of the accumulator and dissipation system 100 is shown and described. For purposes of illustrating aspects of the disclosed subject matter, the system 100 will be described in use with an ammonia refrigeration system.

The accumulator and dissipation system 100 includes a dissipation assembly 104 within a reservoir tank 136, connected to a containment vessel or primary tank 154. These components can be manufactured from metal, including stainless steel. The volatile fluids and agglomerations traveling through the ammonia refrigeration system via conduits (as indicated by arrow 188) enter the primary tank 154 after passing through the dissipation assembly 104 and reservoir tank 136, and exit the reservoir tank 136 via an exhaust vent 160 where any remaining gasses or vapors are vented to the atmosphere (as indicated by arrow 190). The dissipation assembly 104 and reservoir tank 136 provide a two-stage energy dissipation assembly harnessing the energy of the moving volatile fluid agglomeration to cool and trap the volatile fluid so it can be recovered and to reduce ejection of the volatile fluid to the atmosphere.

Referring to FIGS. 2-6, the dissipation assembly 104 is shown within the reservoir tank 136. The dissipation assembly 104 has a tubular body 106 forming a sidewall 108 extending from an inlet 110 at an upper end to a lower opening 112 at a lower end with an angled bottom plate 134, with the ammonia refrigeration system conduit communicating with the inlet 110. The Bottom plate 134 presents an angled surface that redirects downward movement of the fluids and agglomerations toward the wall of the reservoir tank 136. Within the interior of the body 106 are one or more impact bars 116 providing an impact surface for the volatile fluids and agglomerations. The impact bars 116 extend between an upper end 117 downward at an angle to a lower end 119, with the ends 117, 119 communicating with ports 114 extending through the sidewall 108 at various elevations or locations between the inlet 110 and lower end. In an implementation the impact bars 116 extend downward from the upper end 117 adjacent an upper port 114 to the lower end 119 adjacent a lower port 114, and present an upper surface or face that is at an approximately 45-degree angle with respect to a horizontal plane. The impact bars 116 have a generally M-shaped cross section, with the outer legs of the M-shape being curved. The V-portion or middle of the M-shaped cross section forms a V-shaped channel 122 from opposing first and second interior sidewalls 118, 120. The first outer sidewall 124 and first interior sidewall 118 intersect at a first upper edge, and the second outer sidewall 126 and second interior sidewall 120 intersect at a second upper edge. Curved outer legs of the M-shaped cross section are formed by spaced first and second outer sidewalls 124, 126, which form an outwardly projecting, convex, airfoil-like outer surface 125, 127.

An implementation includes an arrangement of the impact bar without a tubular body 106, with the impact bars 116 supported within the reservoir tank 136.

During a release of volatile fluids from an ammonia refrigeration system, the agglomerations encountered by the system 100 have two forms of kinetic energy. A first form of kinetic energy relates to the rectilinear velocity or linear momentum the agglomeration has in the direction it is traveling relative to the conduit walls of the ammonia refrigeration system. The magnitude of linear momentum is strengthened as it travels through the conduit walls. The agglomeration is propelled by trapped high-pressure ammonia gas directly behind the agglomeration that provides a force through the conduit system in which it travels. The longer the conduit system, the more momentum and kinetic energy that will accumulate before the volatile fluid and agglomeration reaches the release boundary, which is traditionally an outlet at the exterior of a building, whereby the contents of the conduit are released to the atmosphere.

A second form of kinetic energy is molecular kinetic energy from the energy within the agglomeration. The molecular kinetic energy is random vibration patterns within each chemical molecule. In a liquid state, the intermolecular collisions between each molecule are not strong enough to overcome the molecular Van DeGraff attractional force, thereby allowing a liquid ammonia state of the substance to exist. As the temperature increases the magnitude of the molecular vibration increases. Once it exceeds the Van DeGraff attractional forces, the substance turns into a gas. When the ambient pressure surrounding the liquid is reduced, this external counteracting force on the intermolecular collisions help overcome the Vand DeGraff attractional forces. Once this force is overcome, the liquid can no longer stay fused together, therefore the molecules begin to break apart forming a gas.

When a high velocity agglomeration enters the dissipation assembly 104, the agglomeration first collides with the impact bars 116. These collisions break up the agglomeration and scatter the initially aligned linear molecular momentum accumulated by the agglomeration as it traveled through the ammonia refrigeration system conduit. This impact breaks apart some of the intermolecular forces that are holding the liquid agglomeration together at the given pressure and temperature state of the system. The transferred momentum from the abrupt impact weakens the molecular attractive forces responsible for retaining the ammonia in a liquid state. The transfer of momentum into additional molecular vibration energy promotes the liquid to flash or evaporate below the boiling point for the respective temperature-pressure saturation line on a psychrometric curve. This flashing or evaporation naturally lowers the vapor pressure, further cooling the system 100, and as a result, the fluids within the reservoir tank 136 and primary tank 154. This natural sub-cooling reduces the vapor pressure which stifles what would normally evaporate or flash to the ambient environment at the release boundary, which in a traditional ammonia refrigeration system, is simply the conduit outlet at the exterior of a building, such as an outlet at the roof of the building. Unobstructed regions 128 within the airstream between the impact bars 116 keeps back pressure from the vaporization to a minimum. Fluids and agglomerations that pass by the impact bars 116 are diverted toward the impact zone 146 by the bottom plate 134 when exiting the lower opening 112.

The reservoir tank 136 extends from an upper portion 138 adjacent the inlet from the conduit system to a lower portion 142 forming a lower opening 150 connected to an inlet 156 of the primary tank 154 forming a fluid connection therebetween. The tank 136 has a sidewall 144 forming a tubular body 140, where the sidewall 144 is spaced apart from the body 106 of the dissipation assembly 104. In an implementation, the interior of the sidewall 108 of the dissipation assembly 104 has an incident of 45 degrees of impact equal to the reflected rebound angle for fluid and agglomerates that exit the lower ends 119 via the lower ports 114. The V-shaped channel 122 is directed toward the side wall 144 whereby the remaining liquid that hasn't flashed is directed towards the lower ports 114 and to the sidewall 144. An impact zone 146 at the interior of the sidewall 144 opposite the lower ports 114 forms an irregular or roughened diffusion surface, such as bumps, ridges, protrusions, or a plurality of orthogonal, spaced slats 148. In an implementation the slats 148 extend from the interior of the sidewall 144 into the reservoir tank 136. The kinetic energy of any remaining liquid rebounded from a first impact with the impact bars 116 is ejected from the lower ports 114 and is further dispersed by the slats 148. The surfaces of the slats 148 promote further breakup of the liquid, resulting in partial atomization of the liquid. This increases the surface exposed to air, thereby lowering the boiling point of liquids in the system and promotes vaporization.

High-velocity liquid within the fluid stream that bypasses the impact bars 116 encounter an additional surface that further enhances vaporization. The convex first and second outer sidewalls 124, 126 form airfoils that create a low-pressure Bernoulli region within the airstream. The low-pressure region created by the airfoil further takes advantage of the linear kinetic energy remaining in the volatile fluid stream. The linear velocity of the agglomeration is inversely proportional to the decrease in pressure surrounding the dual airfoil. The curved shape of the Bernoulli shroud formed by the outer sidewalls 124, 126 increases the velocity of the moving liquid or vapor near the exterior surface of the sidewalls, thereby reducing overall pressure. This lower pressure region enhances vaporization, defined by Boyles law, thereby lowering the boiling point.

Figure 1:
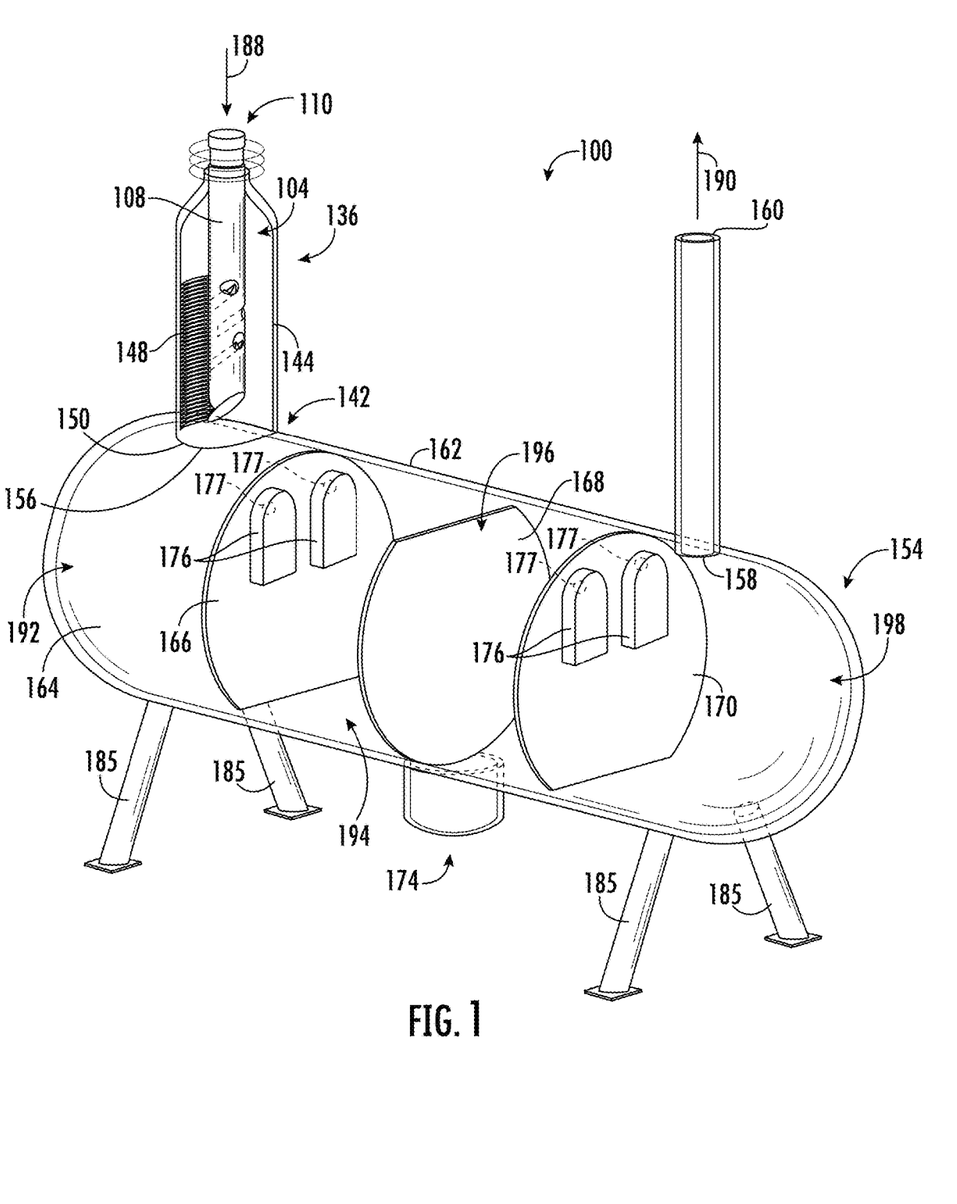
FIG. 1 is an isometric view of an accumulator and dissipation system according to an aspect of the disclosed subject matter.
Figure 2:
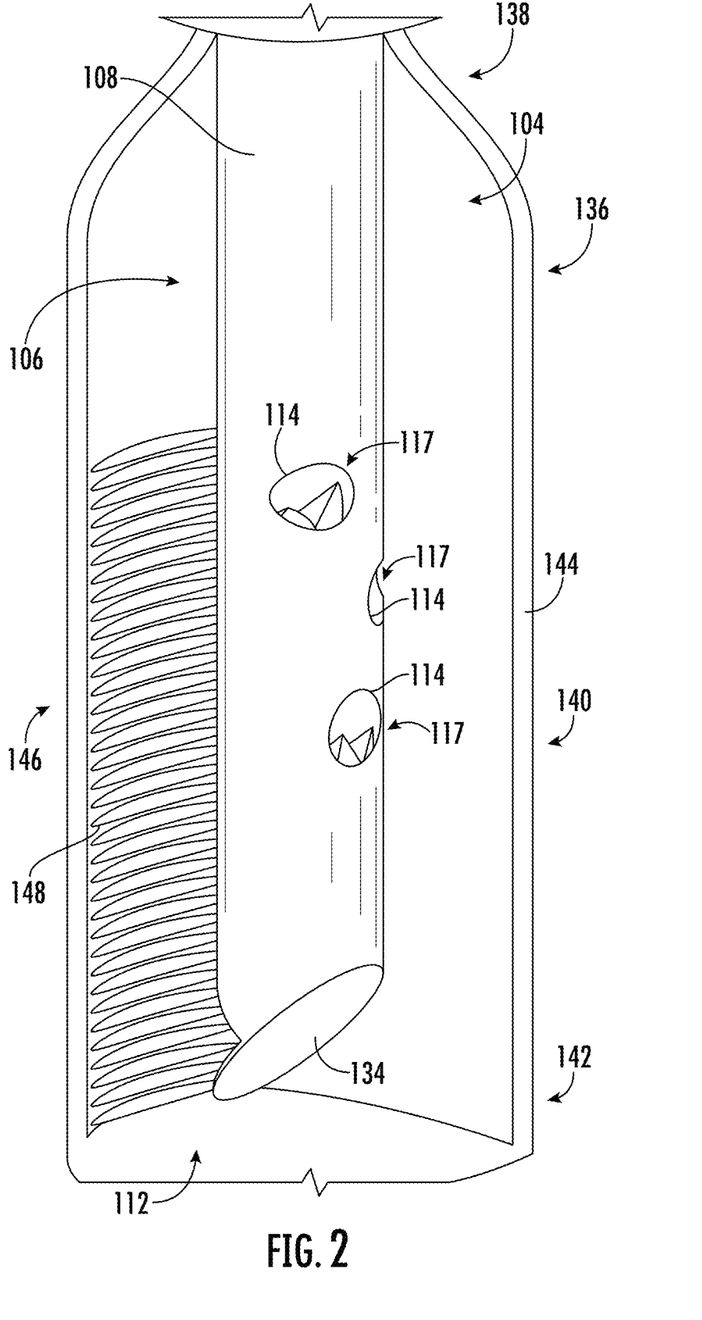
FIG. 2 is an elevation view of the dissipation assembly and reservoir tank according to an aspect of the disclosed subject matter.
Figure 3:
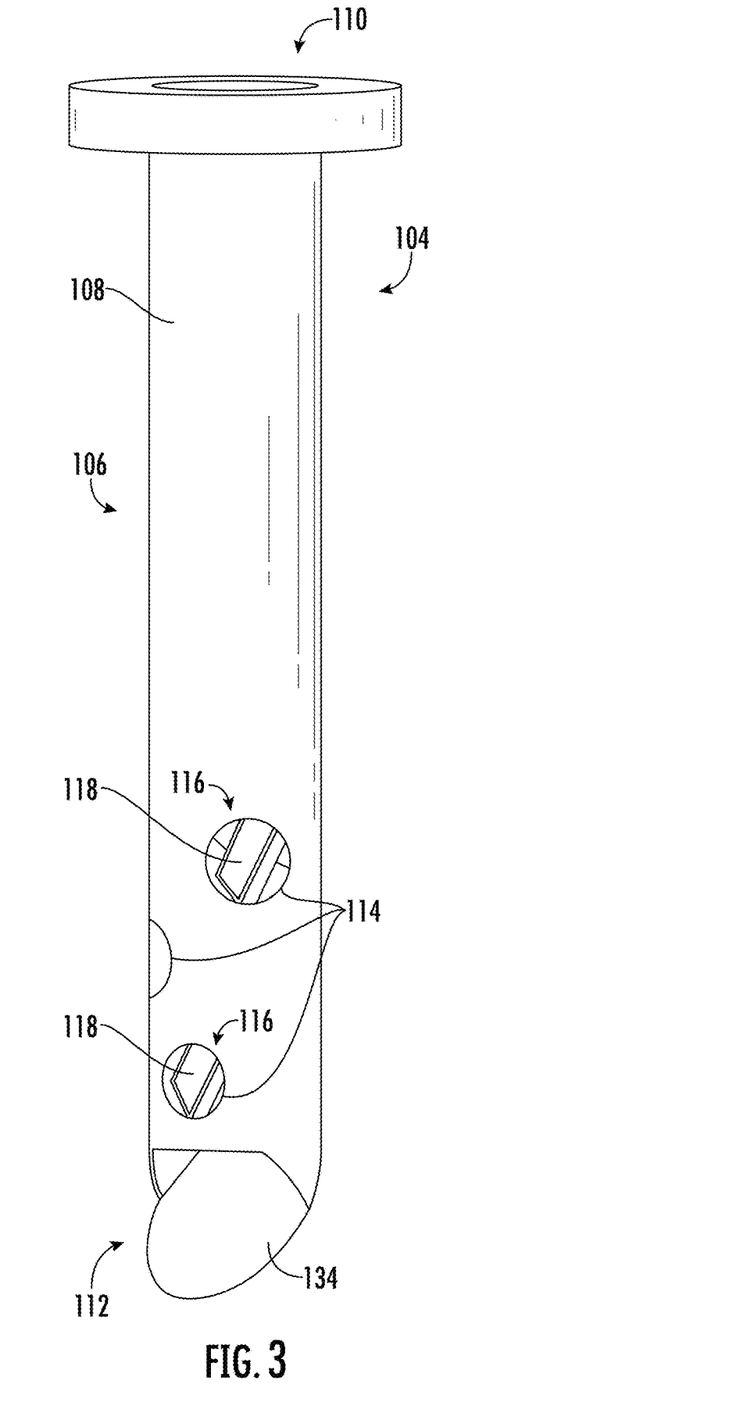
FIG. 3 is an elevation view of the dissipation assembly according to an aspect of the disclosed subject matter.
Figure 4:
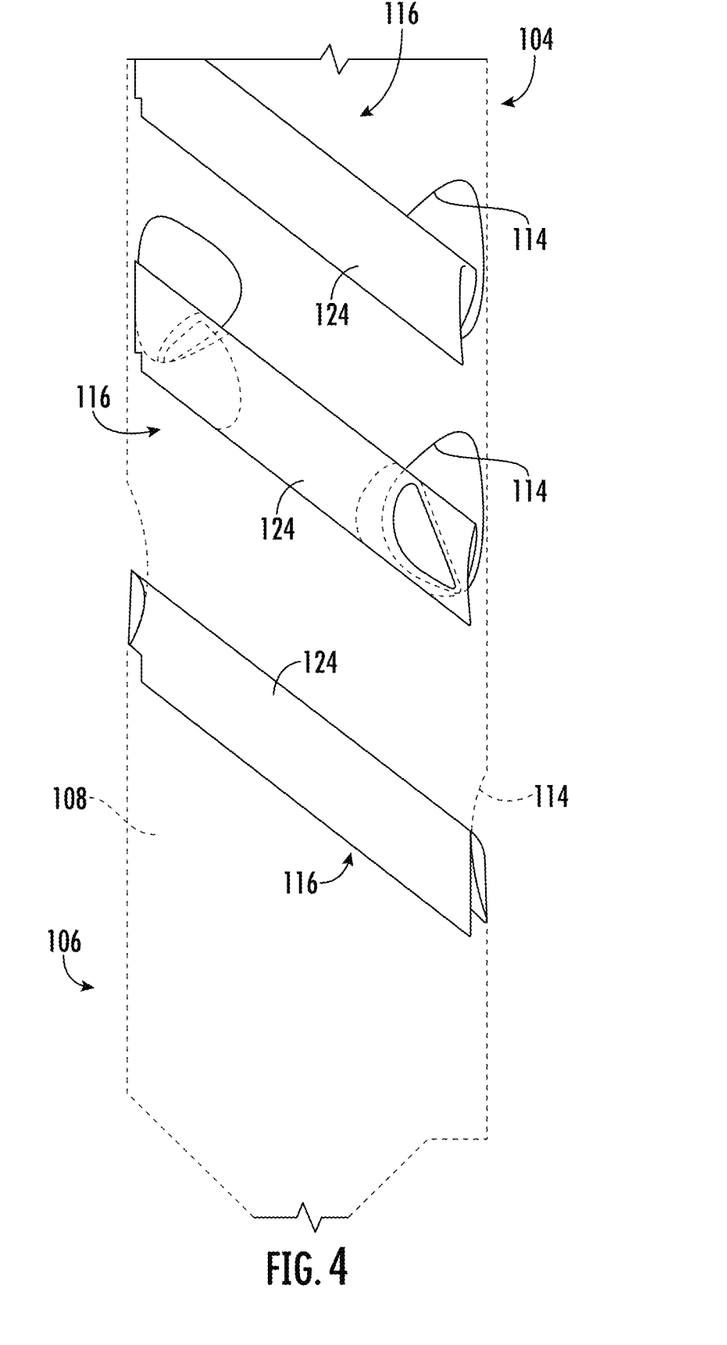
FIG. 4 is an elevation view of the dissipation assembly of FIG. 3
Figure 5:
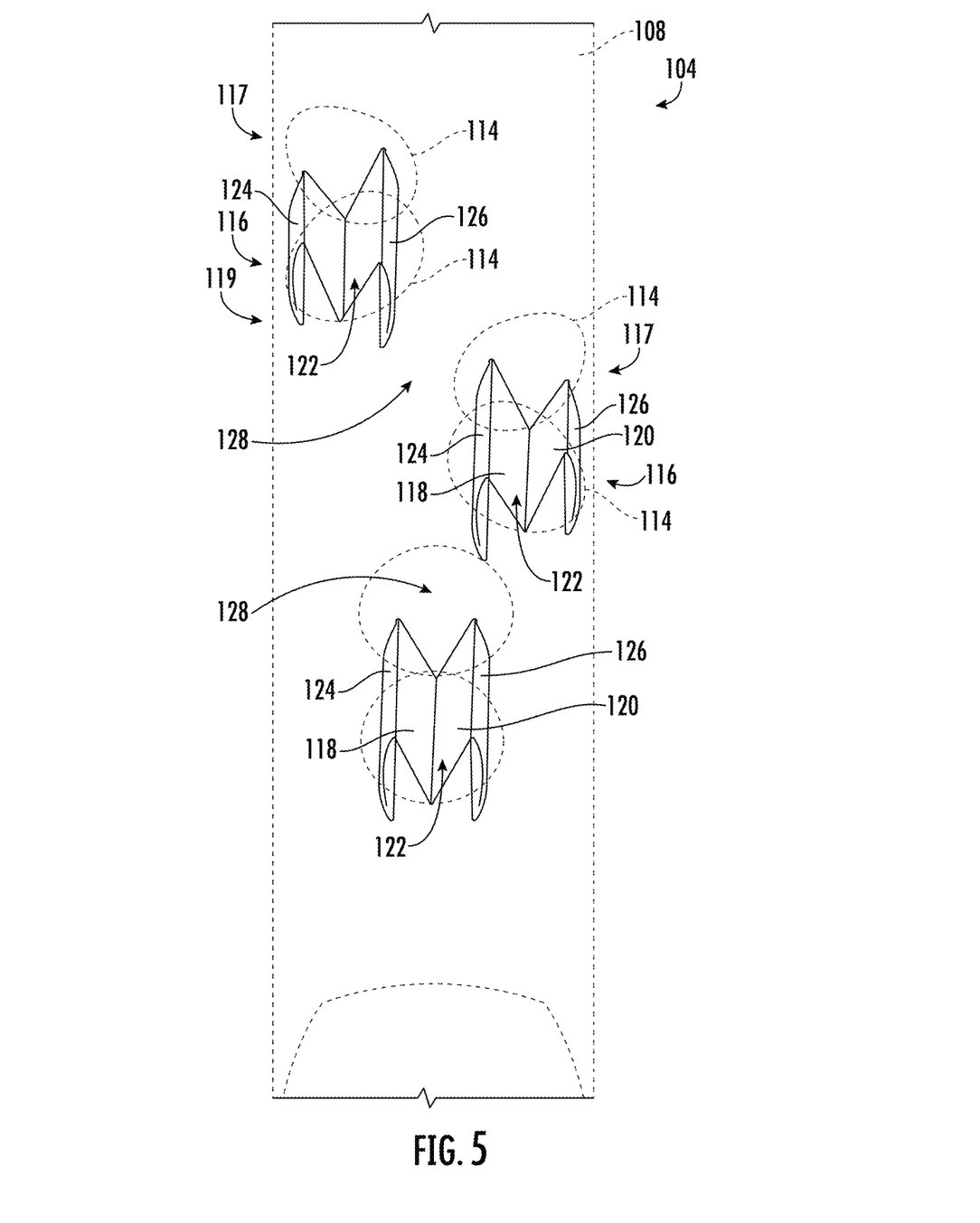
FIG. 5 is an elevation view of the dissipation assembly of FIG. 3.
Figure 6:
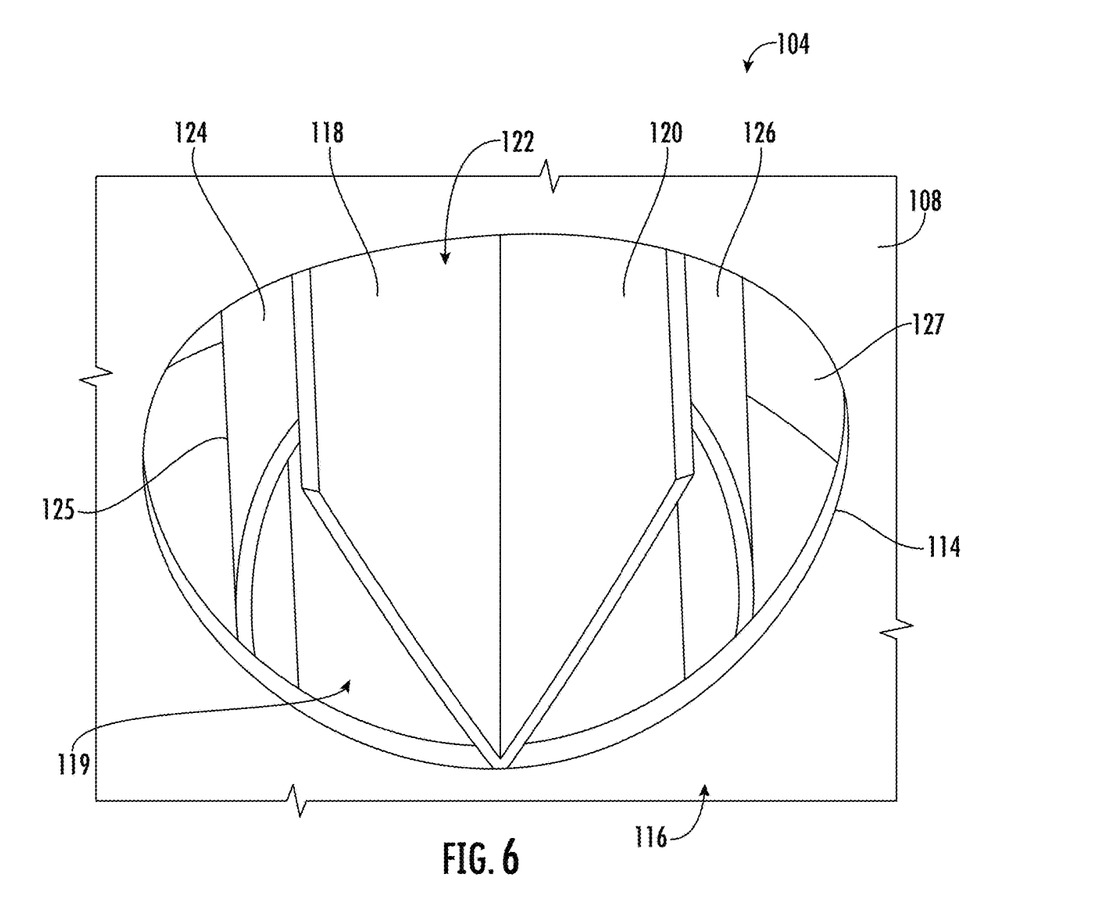
FIG. 6 is an elevation view of the dissipation assembly of FIG. 3.
Figure 7A:
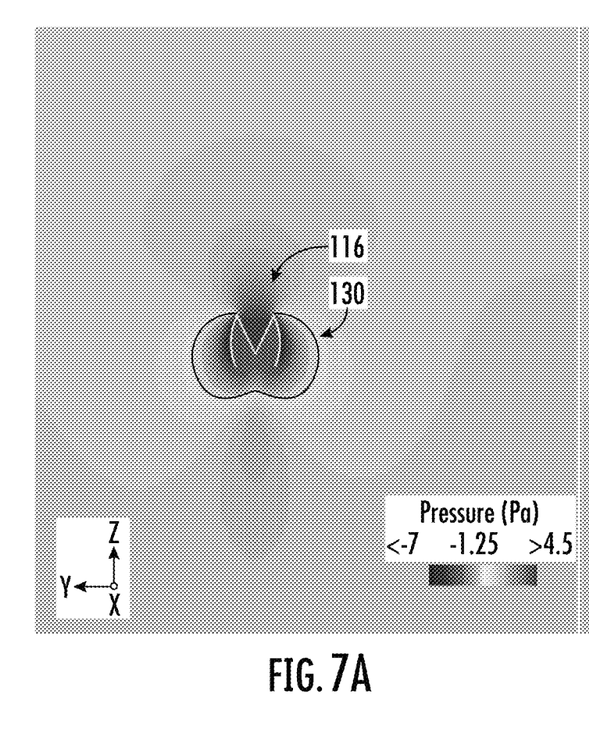
FIG. 7a is a diagram of a comparative computational fluid dynamic analysis of the airfoils involved with the disclosed subject matter.
Figure 7B:
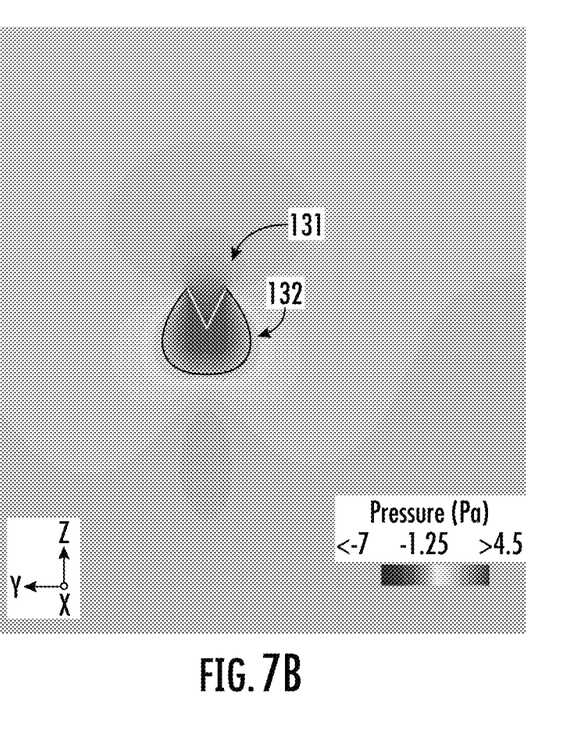
FIG. 7b is a diagram of a comparative computational fluid dynamic analysis of a V-shaped plate without the airfoils involved with the disclosed subject matter.
Figure 8:
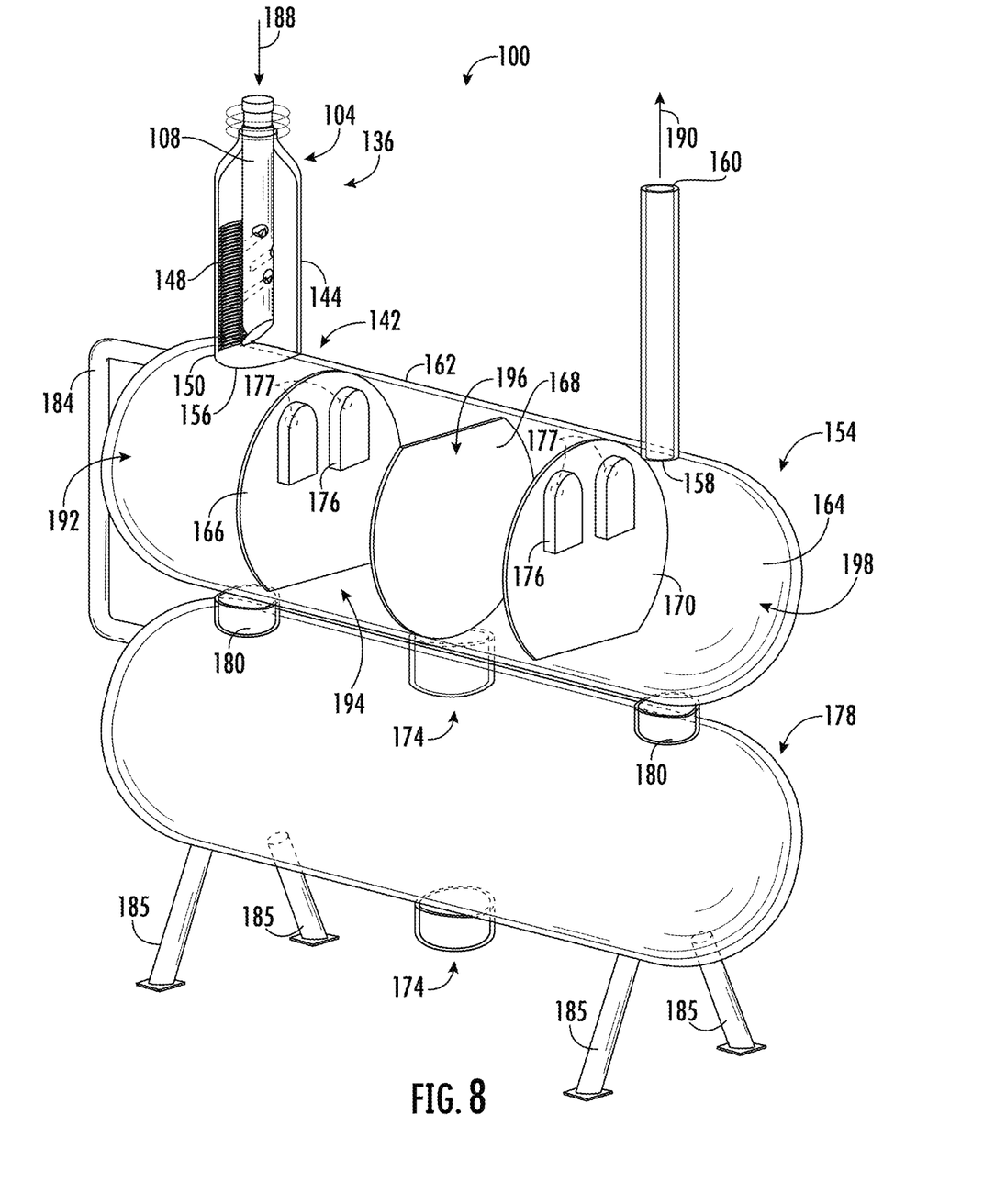
FIG. 8 is an isometric view of an accumulator and dissipation system according to an aspect of the disclosed subject matter.

Referring to FIG. 7*a*, a computational fluid dynamics model of the impact bar 116 is shown in cross-section, end-on, with the airstream flowing from the top of the image to the bottom of the image showing the convex nature of the first outer sidewall 124 and second outer sidewall 126. The figure shows a low-pressure region 130 formed around the convex first and second outer sidewalls 124, 126, with dark, lower-pressure region 130 surrounding the exterior of the sidewalls 124, 126, being the increased low-pressure region 130 within the airstream achieved by the specifically designed dual airfoil impact bar 116. FIG. 7*b* shows a computational fluid dynamics model of a V-shaped bar 131 in cross-section within an airstream flowing from the top of the image to the bottom of the image, and shows the limited low-pressure region 132 in the shadow of the V-shaped bar 131, a result achieved by use of only a V-shaped bar 131. By comparison, the dual airfoil impact bar 116 of the disclosed subject matter generates a 1.5 times greater area of low-pressure, and an increased area of low pressure within the unobstructed airstream, whereas the low-pressure region 132 created by the V-shaped bar 131 is less than the M-shaped impact bar 116 and in the downstream shadow of the V-shaped bar 131.

The processing of various forms of linear kinetic energy of agglomerations by the dissipation assembly 104 and reservoir tank 136 in concert achieves a depressed liquid state. Overall, the system 100 achieves a lower vapor pressure than merely releasing the volatile fluid and agglomeration to the atmosphere, thereby holding the aerosol in a liquid form safely entrapped within the primary tank 154. Any resulting gaseous ammonia released from the primary tank 154 via the exhaust vent 160 is significantly reduced, decreasing the deleterious effect to the surrounding environment compared to traditional direct-to-roof-vented systems. Any liquid that enters the primary tank 154 after the agglomerations encounter the dissipation assembly 104 and reservoir tank 136 undergo natural evaporation that will continue to lower the temperature of the entrapped liquid in the primary tank 154, further reducing the vapor pressure, with the remaining liquid being put at rest in a dormant non-evaporative state. Further, any entrained oil contained in the volatile fluid flow or agglomeration stream will substantially drop out on impact with the various stages of impact and irregular diffusion surfaces of the dissipation assembly 104 and reservoir tank 136. This results in a minimization of oil carry over as a saturated gas stream enters the primary tank 154.

The primary tank 154 collects the volatile fluid in a liquid state and allows contaminants to settle out. The tank 154 has a cylindrical body 162 with an inlet 156 at a first end or upstream end and an outlet 158 at an opposite end or downstream ends, and one or more baffles therein. Within the tank 154 are partial wall structures separating the tank 154 into communicating compartments. In an implementation, there are three baffles secured to the interior sidewall 164 segregating the tank 154 into four compartments. The first baffle 166 and third baffle 170 include downwardly open covers or shields 176 on the second side or downstream side of the baffle to minimize ammonia droplet carryover. In an implementation, within the upper region of the shields 176 are gas ports 177 extending through the wall of the baffle to allow passage of gas from a first side or upstream side of the baffle to the second side or downstream side of the baffle.

The baffles are spaced between the inlet 156 and outlet 158. A first baffle 166 is adjacent the inlet 156 and forms a first compartment 192 between the tank 154 first end. A third baffle 170 is adjacent the outlet 158 and forms a fourth compartment 198 between the tank 154 second end. A second baffle 168 is disposed between the first baffle 166 and third baffle 170, with the first baffle 166 and second baffle 168 forming a second compartment 194 therebetween, and the second baffle 168 and third baffle 170 forming a third compartment 196 therebetween. The first baffle 166 and third baffle 170 form lower openings within the tank 154, and the second baffle 168 forms an upper opening in the tank 154 with the openings allowing passage of gas between compartments to the outlet 158. The primary tank 154 has a drop leg valve 174 in fluid communication with the tank 154 to allow draining of captured ammonia liquid and oils, and legs 185 to elevate the assembly above the surface it is resting on. The valve 174 includes an upwardly open vessel for collecting liquid that accumulates in the tank 154. The valve 174 is in fluid communication with either side of the second baffle 168.

In an implementation, the system 100 containment vessel includes a secondary tank 178 for extra storage of liquid when the total system ammonia charge requires it. The system 100 uses a horizontal tank modular design that allows added liquid ammonia storage by stacking the primary tank 154 over another, secondary tank 178, that is gravity fed via passages 180 providing a fluid communication between the tanks 154, 178. The dual tank system may also employ a fluid connection 184 allowing equalization of the pressures within the two tanks.

The present disclosed subject matter provides a solution to problems with conventional venting of high-pressure fluid by trapping violent discharges of uncontrolled volatile high-velocity gas, liquid, and aerosols combined with soluble agglomeration pockets of heavy compressor lubricating oils accelerating through the vent piping system that leads to an outlet at the exterior of a building. Dangerous pockets of ammonia and oil agglomerations can rupture piping systems, specifically at 90-degree elbows. These angled fittings tend to separate from the main pipe causing injuries and an uncontrolled release of ammonia gas within the facility. The accumulator and dissipation system 100 safely transforms and dissipates the kinetic energy of dangerously accelerated fluids and oil agglomerations utilizing linear momentum and thermodynamic principles to mitigate safety hazards of the dangerously escaping volatile aerosols without any moving parts or active systems that safely entrap and escaping aerosols. In addition, the system traps the liquid while reducing vapor pressure of the escaping volatile chemicals throughs self-cooling depression, eventually diminishing, or abating total evaporation. The trapped liquid can be recovered and recycled, decreasing environmental waste and minimizing the release of gasses into the atmosphere.

Having described the disclosed subject matter, what is claimed as new and desired to be secured by Letters Patent is:

1. An apparatus, comprising:

an impact bar, comprising:

a first outer sidewall and a second outer sidewall, wherein each sidewall forms a convex surface;

a reservoir tank, comprising:
  an internal sidewall forming an irregular surface; and
wherein the impact bar comprises an angled upper surface directed toward the internal sidewall.

2. The apparatus of claim 1, further comprising:
wherein the impact bar further comprises a V-shaped channel disposed between the first outer sidewall and second outer sidewall.

3. The apparatus of claim 2, further comprising:
wherein the V-shaped channel is formed by a first interior sidewall and a second interior sidewall;
a first upper edge formed by the intersection of the first outer sidewall and the first interior sidewall; and
a second upper edge formed by the intersection of the second outer sidewall and the second interior sidewall.

4. The apparatus of claim 1, wherein the irregular surface comprises a plurality of protrusions.

5. The apparatus of claim 1, further comprising:
a primary tank, comprising:
  a first compartment in fluid communication with the reservoir tank;
a first baffle within the primary tank;
a port extending through the first baffle;
a downwardly open cover around the port; and
an exhaust vent in fluid communication with the primary tank.

6. The apparatus of claim 5, further comprising:
wherein the primary tank further comprises:
  a second baffle within the primary tank;
  a third baffle within the primary tank;
  a second port extending through the third baffle;
  a downwardly open cover around the second port; and
  wherein the second baffle is disposed between the first baffle and the second baffle.

7. The apparatus of claim 6, further comprising a secondary tank in fluid communication with the primary tank.

8. The apparatus of claim 1, further comprising an ammonia refrigeration system in fluid communication with the reservoir tank.

9. An apparatus, comprising:
a dissipation assembly, comprising:
a tubular body forming a sidewall extending from an inlet at a first end to a second end, wherein the inlet is in fluid communication with a conduit;
a first port extending through the sidewall at a first location;
a second port extending through the sidewall at a second location;
an impact bar, comprising:
  a V-shaped channel formed by a first interior sidewall and a second interior sidewall; and
  wherein the V-shaped channel extends between the first port and the second port;
a reservoir tank, comprising:
  an internal sidewall; and
wherein the impact bar comprises an angled upper surface directed toward the internal sidewall.

10. The apparatus of claim 9, further comprising:
a primary tank, comprising:
  a first compartment in fluid communication with the reservoir tank;
  a first baffle within the primary tank;
  a second baffle within the primary tank; and
  a third baffle within the primary tank;
wherein the second baffle is disposed between the first baffle and the second baffle; and
an exhaust vent in fluid communication with the primary tank.

11. The apparatus of claim 10, further comprising:
a first port extending through the first baffle; and
a second port extending through the third baffle.

12. The apparatus of claim 9, further comprising an ammonia refrigeration system in fluid communication with the reservoir tank.

13. The apparatus of claim 9, wherein the internal sidewall forms an irregular surface.

14. The apparatus of claim 13, wherein the irregular surface comprises a plurality of orthogonal, spaced slats that project from the internal sidewall.

15. A system for capturing exigent vented volatile fluids, comprising:
a dissipation assembly, comprising:
  a tubular body forming a sidewall extending from an inlet to a lower opening;
  an angled bottom plate at the lower opening;
  a port extending through the sidewall;
  an impact bar within the tubular body, the impact bar comprising:
    a first outer sidewall and a second outer sidewall, wherein each sidewall forms an outwardly projecting convex surface; and
    a V-shaped channel disposed between the first outer sidewall and the second outer sidewall, wherein the V-shaped channel is in fluid communication with the port;
a reservoir tank, comprising:
  a tubular body forming a sidewall extending from an upper portion to a lower portion;
  an irregular surface at an interior of the reservoir tank; and
  wherein the port is directed toward the irregular surface;
a primary tank, comprising:
  a first compartment in fluid communication with the reservoir tank;
  a first baffle within the primary tank;
  a first port extending through the first baffle;
  a downwardly open cover around the first port;
  an exhaust vent in fluid communication with the primary tank; and
  a drop leg valve in fluid communication with the primary tank;
wherein the dissipation assembly is disposed within the reservoir tank; and
wherein the lower portion of the reservoir tank is in fluid communication with the primary tank.

16. The system of claim 15, further comprising:
wherein the primary tank further comprises:
  a second baffle within the primary tank;
  a third baffle within the primary tank;
  a second port extending through the third baffle;
  a downwardly open cover around the second port; and
  wherein the second baffle is disposed between the first baffle and the second baffle.

17. The system of claim 15, further comprising:
wherein the first baffle forms a lower opening;
wherein the second baffle forms an upper opening; and
wherein the third baffle forms a lower opening.

18. The system of claim 16, further comprising a secondary tank in fluid communication with the primary tank.

19. The system of claim 15, wherein the irregular surface comprises a plurality of protrusions.

20. The system of claim 15, further comprising an ammonia refrigeration system in fluid communication with the dissipation assembly.

\* \* \* \* \*